July 31, 1934.  R. A. SWENSON  1,968,269
DIPPED CANDLE
Filed Jan. 11, 1932

Inventor
Reuben A. Swenson
by Bruce K. Brown Atty.

Patented July 31, 1934

1,968,269

UNITED STATES PATENT OFFICE 1,968,269

DIPPED CANDLE

Reuben August Swenson, Hammond, Ind., assignor to Standard Oil Company, Chicago, Ill., a corporation of Indiana Application January 11, 1932, Serial No. 585,811

16 Claims. (Cl. 87—21)

This invention relates to a process and to a composition of matter for coating articles such as candles and the like.

The object of this invention is to produce a quick drying metallic coating composition for use in decorating candles. Another object is to produce a coating composition which will not dissolve the paraffin wax when applied to the candle. A further object is to produce a coating composition that will not accumulate on the wick of the candle and smother the flame.

Heretofore, varnish compositions comprising turpentine, mineral solvents, benzol and the like have been used as a vehicle for applying a decorative metallic coating on candles but such varnish solutions dissolve a small amount of the paraffin when applied to the candle and produce a sticky and slow drying coating. After the coating has dried, which usually takes a long time, the finished product is of an uneven color and consequently is worthless for commercial use. Also the metallic varnish compositions heretofore used mix with the molten wax in the crater of the candle and collect on the wick and smother the flame. For example, shellac coated candles are very unsatisfactory because the shellac accumulates on the wick of the burning candle and soon smothers the flame.

Referring to the drawing:—

Figure 1:
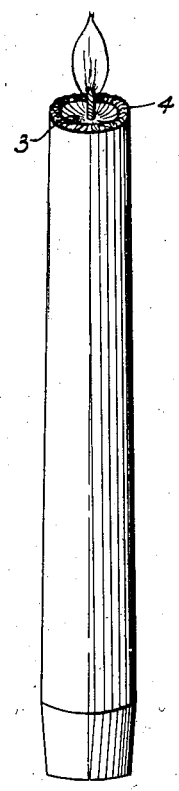
Fig. 1 is an elevational view of a candle embodying my invention.
Figure 2:
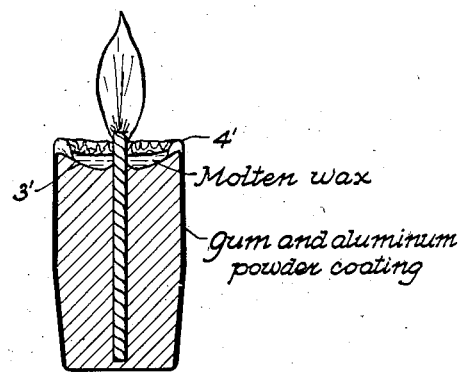
Fig. 2 is an enlarged sectional view of the candle after having been progressively burned to a point near to its lowermost extremity.

I have found that highly volatile organic solvents and particularly the volatile ketonic organic solvents that do not dissolve paraffin wax may be used as a suitable vehicle for coating compositions comprising either synthetic ester gums or gum elemi, or mixtures of these gums. Also an excellent metallic coating composition can be prepared by incorporating a powdered metal into the mixture of gum and solvent. A glossy metallic coating will be imparted to the candles when dipped into a bath of this coating composition. The coating compositions prepared from ester gums will melt, or soften uniformly and progressively as the candle burns but will maintain a well defined crater around the wick, as shown at 3 and 3' of Figures 1 and 2 respectively. The molten ester gums will remain on the rim 4 and 4' that surrounds the crater of molten wax and will not pass into the molten wax and smother the flame. Also, the metallic particles carried by the ester gums will be retained on the rim that surrounds the crater of molten wax and will not interfere with the burning of the candle. The ester gums are not burned by the candle but are merely converted into a semi-molten state, consequently, as the candle burns, the ester gum and metallic powder roll up on the rim of the candle as shown at 4 and 4'. A candle coated with ester gum and metallic powder can burn from top to bottom without the flame being impaired by the coating.

A coating composition of the following ingredients may be used as a suitable dipping bath for applying a silver-like coating on candles.

Example I

| | |
|---|---|
| Acetone | 1 liter |
| Ester gums | 300 grams |
| Aluminum powder | 400 grams |

The coating composition is prepared by mixing the metallic powder with a solution of the solvent and ester gum at about room temperature. The synthetic ester gums are well known commercial products and are prepared by esterifying either rosin, copal resins or similar resins with glycerine, glycol or similar polyhydroxy alcohols. Ester gums may be prepared as described in "Synthetic Resins and their Plastics" by Ellis, 1923 Edition, Chapter 16. The ester gums which melt within the range of 122° C. to 145° C. have been found to be very suitable for coating candles.

Also certain natural gums are suitable for preparing a metallic-like coating composition for coating candles.

Example II

| | |
|---|---|
| Methyl alcohol and acetone 50% mixture | 1 liter |
| Copal resin | 100 grams |
| Gum elemi | 200 grams |
| Aluminum powder | 400 grams |

Also a suitable coating composition can be made from mixtures of gums, and preferably those gums that give coatings which melt within the range of 122° C. to 145° C.

Example III

| | |
|---|---|
| Acetone | 1 liter |
| Ester gum | 230 grams |
| Gum elemi | 70 grams |
| Bronze powder | 900 grams |

A suitable ester gum composition may be prepared from a mixture of synthetic ester gums. For example, a mixture comprising glycol di-resinate and glycerol tri-resinate may be used as a suitable vehicle for the metallic powders. Generally the two resinates are mixed in proportions to give a product which melts within the range of 122° C. to 145° C., but preferably within the range of 125 to 132° C.

*Example IV*

| | |
|---|---|
| Acetone | 1 liter |
| Mixture of glycol di-resinate and glycerol tri-resinate | 300 grams |
| Aluminum powder | 400 grams |

In the above examples the glycol di-resinate may be replaced with polyhydric alcohol esters prepared from adipic acid, pimelic acid, etc. or the glycerol esters prepared from copal resins such as manila copal, angola copal, and borneo copal. Also, certain ester gums appear on the market under the trade name of "Abrac", "Lewisol No. 1" and "Lewisol No. 2", and I have found that such ester gums that melt within the range of about 122° C. to 145° C. may be successfully used for the purpose of my invention.

In the above examples and for the purpose of this invention I may use any volatile organic gum solvent that will not dissolve the candle when dipped into the bath of coating composition. The best examples of suitable solvents for ester gums and the like are acetone, diethyl ketone, diacetone alcohol, ethyl methyl ketone, diethyl carbonate dioxane and mixtures of these and/or other solvents. The amount of solvent to be used may be varied according to the desired concentration of the dipping bath. Also the proportions of gum and metallic powder may be varied without departing from the scope of the invention. For example, the amount of gum in the above examples may be varied from 150 to 450 grams, and the amount of metallic powder used may be from two to three times the amount of gum. Generally the amount of gum to be used is determined by the amount necessary to prevent the metallic particles from rubbing off the candle. In Example III gum cumar may be used in place of gum elemi.

The candles are coated in the usual way by dipping them into a bath of the coating composition and then permitting them to dry. The solvents used are very volatile and the candles dry very rapidly. The solvents, for example, acetone, do not dissolve the candle when dipped into the bath and consequently the bath may be used indefinitely without becoming contaminated with paraffin wax.

The candles to be coated should have a superficial coating of a non-acidic substance such as substantially pure paraffin wax and the like, because an acidic superficial coating, such as stearic acid, will attack the metallic gum coating and cause peeling.

Although my invention has been described as it would be used to coat candles, it may be used on any waxy article or similar articles.

The above examples represent the preferred mode of practicing my invention, but they are not to be construed as limitations upon the scope of the invention.

I claim:

1. A candle having superficial coating of a composition comprising a metallic powder, and a mixture of ester gums having a melting point within the range of 122 to 145° C.

2. A candle having a superficial coating of a composition comprising aluminum powder, and a mixture of ester gums, said coating melting within the range of 122 to 145° C.

3. A candle having a superficial coating of ester gum melting within the range of 122 to 145° C.

4. A candle having a superficial coating of mixed ester gums which melt within the range of 122 to 145° C.

5. An article of manufacture comprising a candle having a superficial coating of a composition comprising a metallic powder, and a gum selected from the group consisting of an ester gum having a melting point within the range of 122 to 145° C. and gum elemi.

6. An article of manufacture comprising a candle having a superficial coating of a composition comprising a metallic powder and a mixture of ester gum and gum elemi, said ester gum having a melting point within the range of 122 to 145° C.

7. An article of manufacture comprising a candle having a superficial coating of a composition comprising a metallic powder, and a sufficient quantity of an ester gum having a melting point within the range of 122 to 145° C. to prevent the metallic powder from rubbing off the candle.

8. An article of manufacture comprising a candle having a superficial coating of a composition comprising a powdered metal and an ester gum which melts within the range of 122 to 145° C.

9. An article of manufacture comprising a candle having a superficial coating of a composition comprising powdered aluminum and an ester gum which melts within the range of 122 to 145° C.

10. An article of manufacture comprising a candle having a superficial coating of a composition comprising a metallic powder and a mixture of synthetic ester gums which melt within the range of 122 to 145° C.

11. The process of coating a candle with finely divided metallic powder which comprises dipping said candle into a bath comprising a volatile ketonic organic solvent, a metallic powder, and an ester gum which melts within the range of 122 to 145° C.

12. The process of coating a candle with a finely divided metallic powder which comprises dipping said candle into a bath comprising a volatile aliphatic ketonic solvent, a finely divided metallic powder, and a mixture of synthetic ester gums which melt within the range of 122 to 145° C.

13. The process of applying a superficial coating to a candle which comprises dipping said candle into a solution of a volatile aliphatic ketone and an ester gum, said ester gum having a melting point within the range of 122 to 145° C.

14. The process of coating a candle with a finely divided metallic powder which comprises applying to the surface of said candle a liquid coating composition comprising acetone, a finely divided metallic powder and an ester gum having a melting point within the range of 122 to 145° C.

15. The process of preparing a candle having a superficial coating of a decorative material, which comprises applying to the surface of said candle a coating composition containing an aliphatic ketone containing from three to five carbon atoms, and a mixture of synthetic ester gums which have a melting point within the range of 122 to 145° C.

16. An article of manufacture comprising a candle provided with a wick, and having a superficial coating of a composition comprising a metallic powder and an ester gum having a melting point within the range of 122 to 145° C., said superficial coating having the property of softening uniformly and progressively as the candle burns and maintaining a well defined crater around the wick of said candle.

REUBEN AUGUST SWENSON.